(12) United States Patent
Schwarzkopf

(10) Patent No.: US 6,250,911 B1
(45) Date of Patent: Jun. 26, 2001

(54) ELECTRICAL HEATER FOR USE IN A MOLD OF AN INJECTION-MOLDING MACHINE

(75) Inventor: Eugen Schwarzkopf, Lüdenscheid (DE)

(73) Assignee: Hotset Heizpatronen U. Zubehohr GmbH, Ludenscheid (DE)

( * ) Notice: Subject to any disclaimer, the term of this patent is extended or adjusted under 35 U.S.C. 154(b) by 1149 days.

(21) Appl. No.: 08/707,267

(22) Filed: Sep. 4, 1996

Related U.S. Application Data

(63) Continuation of application No. 08/302,620, filed on Sep. 8, 1994, now abandoned.

(30) Foreign Application Priority Data

| Apr. 7, 1994 | (DE) | 44 11 887 |
| May 30, 1994 | (DE) | 44 18 828 |

(51) Int. Cl.⁷ .................................................. B29C 45/26
(52) U.S. Cl. .................. 425/547; 425/DIG. 13; 425/DIG. 245; 425/DIG. 246
(58) Field of Search .................. 425/547, 549, 425/DIG. 13, DIG. 245, DIG. 246; 219/544, 530, 540, 534

(56) References Cited

U.S. PATENT DOCUMENTS

| Re. 30,126 | * 10/1979 | Churchill | 219/544 |
| 1,667,857 | * 5/1928 | Harpster et al. | 219/544 |
| 4,197,449 | * 4/1980 | Fessenden | 219/544 |
| 4,263,577 | * 4/1981 | Bauchert et al. | 219/544 |
| 4,300,038 | * 11/1981 | Schwarzkopf | 219/544 |
| 4,575,619 | * 3/1986 | Porzky | 219/542 |
| 4,593,182 | * 6/1986 | Schwarzkopf | 425/549 |
| 4,642,043 | * 2/1987 | Schwarzkopf | 425/549 |
| 5,247,158 | * 9/1993 | Steinhauser et al. | 219/544 |

FOREIGN PATENT DOCUMENTS

9217834 * 4/1993 (DE).

* cited by examiner

Primary Examiner—Tim Heitbrink
(74) Attorney, Agent, or Firm—Herbert Dubno; Andrew Wilford

(57) ABSTRACT

An electrical heater for a mold has an elongated tubular casing made of a ductile metal and deformable by hand, a manually deformable electrical heating element extending longitudinally inside the casing, and a manually deformable mass of electrically insulating potting filling the casing around the element. The casing can be annularly corrugated and formed by a succession of like U-section rings each having a pair of parallel legs and a bight portion and a succession of like rounded annular webs interconnecting the rings and each joining a leg of one respective ring with a leg of an adjacent respective ring.

7 Claims, 3 Drawing Sheets

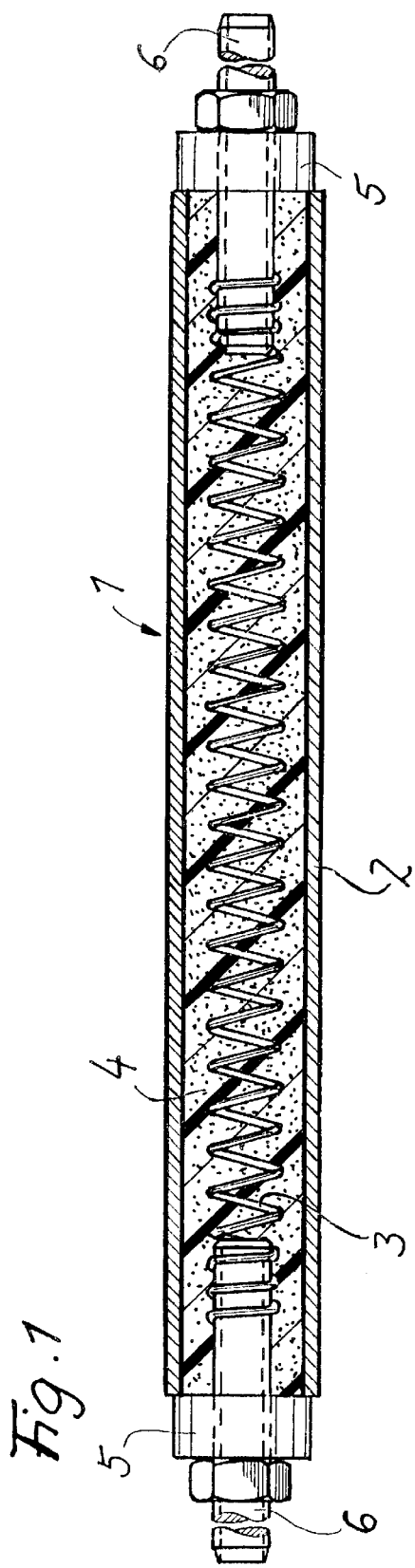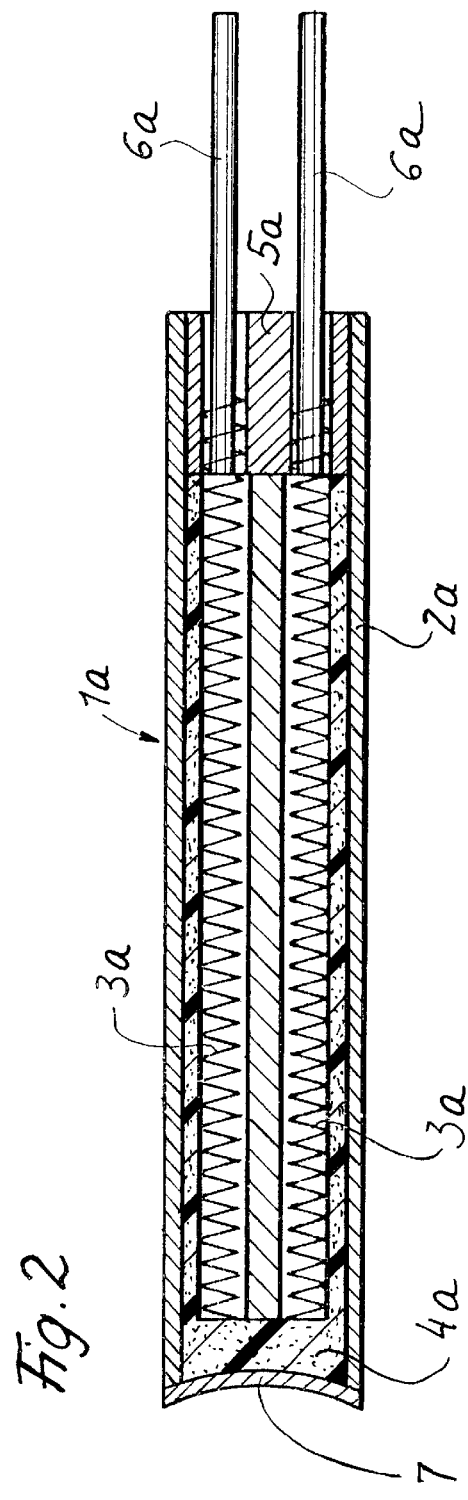
Fig.1
Fig.2

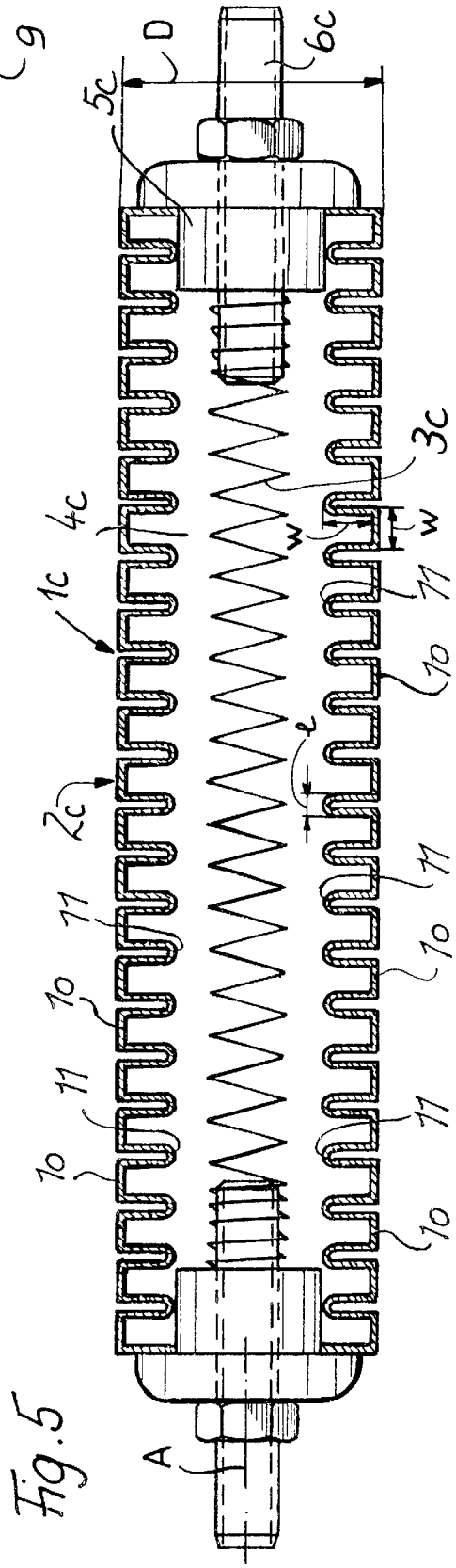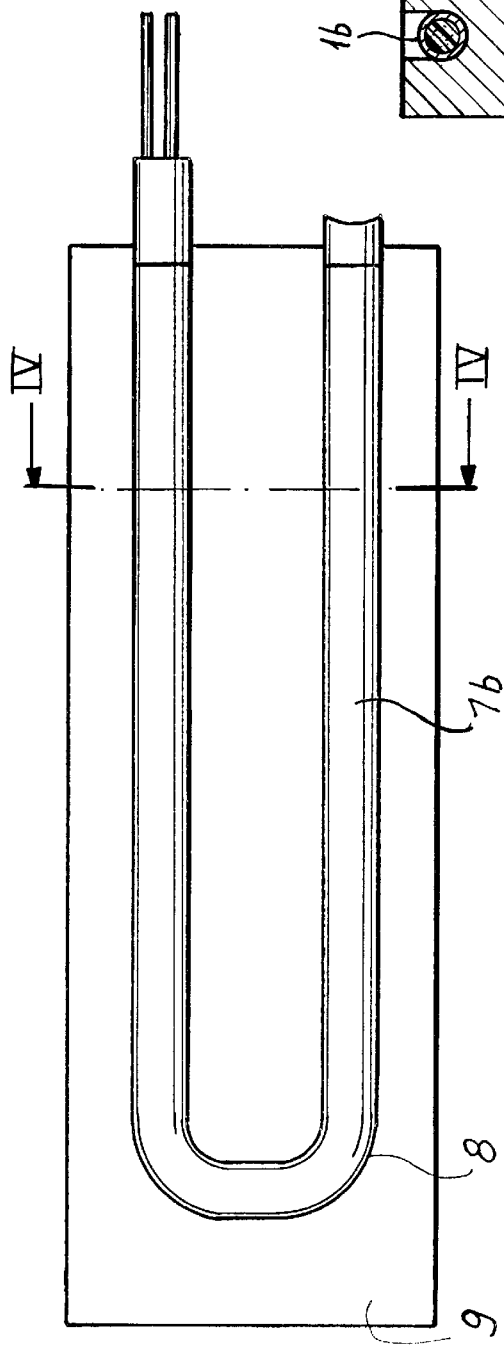

ELECTRICAL HEATER FOR USE IN A MOLD OF AN INJECTION-MOLDING MACHINE

CROSS REFERENCE TO RELATED APPLICATION

This is a file-wrapper continuation of application Ser. No. 08/302,620 filed Sep. 8, 1994 now abandoned.

FIELD OF THE INVENTION

The present invention relates to heater usable in an injection-molding mold.

BACKGROUND OF THE INVENTION

A standard heater for an injection-molding mold has a normally cylindrical casing made of metal and coaxially receiving an electrical resistance-type heater wire normally shaped as a helix. A mass of electrically insulating but thermally conductive potting surrounds the heater wire and fills the interior of the casing. Terminals at one or both ends of the casing connect to the ends of the resistance wire.

Such a heater is seated in a groove in the mold and an electrical current is passed through its heater element to heat it and the mold. When the element burns out, which is inevitable, the old heater is pried out and a new one is fitted to the groove, normally being potted in place with heat-conductive material or grout and/or being clamped down in the groove.

It is fairly common for the groove to be nonstraight. Thus the heater must be bent to the necessary nonstraight shape. Since the casing is normally made of a high-alloy steel, this bending must take place in a shop and be carried out to high tolerances in order to ensure a good fit of the heater in the groove. Obviously this bending/fitting operation is expensive and considerably raises the cost of replacing the heaters in a mold plate. Moreover the refitting operation can be delayed as the appropriately bent heaters are made up.

OBJECTS OF THE INVENTION

It is therefore an object of the invention to provide an improved heater for an injection-molding mold.

Another object is to provide such a heater which can be installed in a simple low-cost manner.

A further object is the provision of a heater assembly for a mold which offers superior heat exchange and where the heater can easily be replaced.

SUMMARY OF THE INVENTION

These objects are achieved according to the invention in a heater having, as is known, an elongated tubular casing, an electrical heating element extending longitudinally inside the casing, and a mass of electrically insulating potting filling the casing around the element. According to the invention the casing is made of a ductile metal and is deformable by hand, and the electrical heating element and potting mass are also easily deformed by hand.

Thus according to this invention the heater can be bent by hand to fit the mold plate. The potting, which is relatively incompressible but flexible, allows the casing and element to bend without substantial change in the cross-sectional shape of the heater. The refitter need merely have a heater of the right length and diameter, and he can bend it at the site to fit the mold. This greatly simplifies the installation.

According to this invention the metal contains copper. It can also be nickel.

In another arrangement corresponding generally to that of German Utility Model 92 17 183.4 the casing is annularly corrugated and formed by a succession of like U-section rings each having a pair of parallel legs and a bight portion interconnecting the respective legs and a succession of like rounded annular webs interconnecting the rings and each joining a leg of one respective ring with a leg of an adjacent respective ring. Each leg and each bight portion has a respective width and the transverse widths are all generally the same. Such a heater can be bent readily but will maintain its cross-sectional shape very well.

According to more specific features of this embodiment of the invention the casing has a transverse width that is about five times as great as the width of the legs. Furthermore, each web has a longitudinal width equal to between one-fifth and one-seventh the width of the legs.

It is possible for the casing according to the invention to be of generally rectangular section with rounded longitudinally extending corners. Such a heater fits in a steel plate formed with a nonstraight groove of a section complementary to a section of the casing. The section of the groove is generally rectangular and has a plurality of flat sides and the plate has a face surface parallel to at least one of the sides.

BRIEF DESCRIPTION OF THE DRAWING

The above and other objects, features, and advantages will become more readily apparent from the following description, reference being made to the accompanying drawing in which:

FIG. 1 is a longitudinal section through an electrical heater according to the invention;

FIG. 2 is a section like FIG. 1 of another heater in accordance with this invention;

FIG. 3 is a top view of an assembly incorporating a heater according to the invention;

FIG. 4 is a cross-section taken along line IV—IV of FIG. 3;

FIG. 5 is a section like FIG. 1 of another heater according to the invention.

SPECIFIC DESCRIPTION

Figure 6:
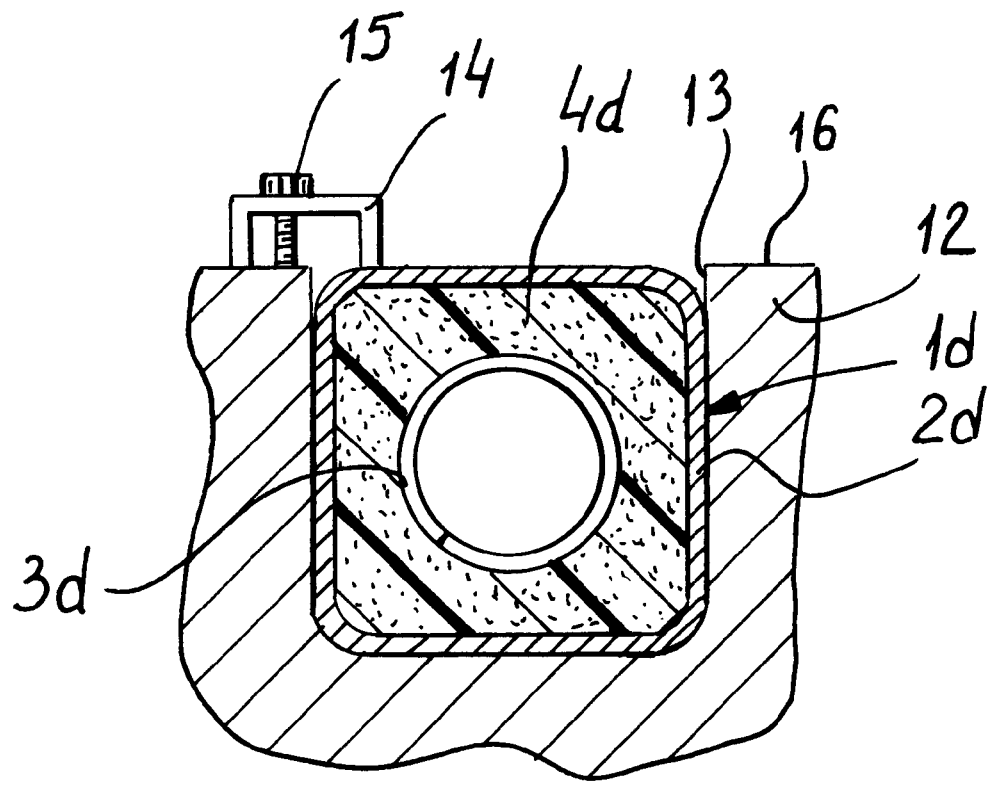
FIG. 6 is a section through a heater assembly in accordance with this invention.

As shown in FIG. 1 a heater 1 has a cylindrical metallic casing made of a highly ductile copper alloy and a helical resistance-heating wire 3 extending coaxially through it. A mass 4 of flexible MgO potting material fills the interior of the casing 2 around the element 3. The ends of the element 3 are connected to terminal pins 6 seated in ceramic end caps 5 fitted to the casing 2. This heater 1 can easily be plastically deformed by hand.

FIG. 2 shows a heater cartridge 1a having a cylindrical casing 2a made of substantially pure nickel and containing a U-shaped resistive heating wire 3a seated in a mass 4a of potting. At one end of the casing 2a a double-hole end cap 5a is traversed by a pair of terminal leads 6a connected to the ends of the heating wire 3a and a nickel end cap 7 seals the opposite casing end.

FIGS. 3 and 4 show a heater cartridge 1b of the same construction as shown in FIG. 2 that has been bent into a J- or U-shape and fitted to a complementarily shaped groove 8 cut in a steel mold plate 9. The heater 1b is typically grouted or potted in place and may be held down with nose-like clamps or the like.

The arrangement of FIG. 5 has a casing 2c which is corrugated, being formed of square U-section rings 10 secured together by short U-shaped webs 11. A helical resistance-heating wire 3c extends coaxially through the casing 2c and a mass 4c of flexible potting material fills the interior of the casing 2c around the element 3c. The ends of the element 3c are connected to terminal pins 6c seated in ceramic end caps 5c fitted to the casing 2c.

The rings 10 are each formed by a pair of identical legs of a width w measured radially of the axis A which is identical to a width w measured parallel to the axis a of bights joining the legs of each ring 10 together. The width w is equal to about one fifth of a diameter D of the heater 1c. The webs 11 have an axial length l equal to between one-fifth and one-seventh of the width w. The resultant assembly can easily be bent to fit a mold-plate groove.

In FIG. 6 a heater 1d has a generally square-section corrugated casing 2d made of high-alloy steel or even titanium and provided with a heater element 3d and magnesium-oxide potting 4d. This heater 1d is set in a plate 12 formed with a substantially square-section groove 13 complementary to the casing 2d. The corners of the casing 2d and groove 13 are rounded. Clamping noses 14 secured in place by bolts 15 secure the heater 1d in place flush with an outer face 16 of the plate 12.

I claim:

1. An electrical heater for a mold, the heater comprising:
   an elongated tubular casing of polygonal cross section, extending along an axis, annularly corrugated, made of a ductile metal, and deformable by hand, the casing being unitarily formed by
      a succession of generally rectangular and inwardly open U-section rings each having a pair of parallel legs extending transversely of the axis and a bight portion extending flatly parallel to the axis, and
      a succession of annular webs interconnecting the rings and each joining a leg of one respective ring with a leg of an adjacent respective ring, each leg and each bight portion having a respective transverse width, the transverse widths of the legs and of the bights all being generally the same, the casing having a transverse width and that is about five times as great as the width of the legs, each web having a longitudinal width equal to at most one-fifth the width of the legs;
   a manually deformable electrical heating element extending longitudinally inside the casing; and
   a manually deformable mass of electrically insulating potting filling the casing around the element.

2. The mold heater defined in claim 1 wherein the metal contains copper.

3. The mold heater defined in claim 1 wherein the metal is nickel.

4. The mold heater defined in claim 1 wherein each web has a longitudinal width equal to at least one-seventh the width of the legs.

5. The mold heater defined in claim 1 wherein the casing has rounded longitudinally extending corners.

6. The mold heater defined in claim 1, further comprising
   a steel plate formed with a nonstraight groove of a section complementary to a section of the casing.

7. The mold heater defined in claim 6 wherein the rings each have a plurality of flat sides, the plate having a face surface parallel to at least one of the sides.

* * * * *